United States Patent
Kondo et al.

[11] 3,981,709
[45] Sept. 21, 1976

[54] EDGE PROCESSING OF CHEMICALLY TOUGHENED LENSES

[75] Inventors: Fumio Kondo, Zushi; Masayuki Kondo, Tokyo; Tsuneyoshi Itoh, Tokyo; Koji Sato, Tokyo, all of Japan

[73] Assignee: Tokyo Kogaku Kikai Kabushiki Kaisha, Tokyo, Japan

[22] Filed: Apr. 7, 1975

[21] Appl. No.: 565,457

[30] Foreign Application Priority Data
Apr. 10, 1974 Japan.................................. 49-41233

[52] U.S. Cl. ...................................... 65/30 E; 65/61; 51/101 LG; 51/284
[51] Int. Cl.².................. C03C 15/00; C03C 19/00; B24B 7/00; B24B 1/00
[58] Field of Search .......... 51/101 LG, 284; 65/120, 65/61, 30 R

[56] References Cited
UNITED STATES PATENTS

| | | |
|---|---|---|
| 1,766,509 | 6/1930 | Grambach ........................... 65/61 X |
| 1,852,840 | 4/1932 | Fuwa et al. .......................... 65/120 |
| 2,329,713 | 9/1943 | Goddu............................ 51/101 LG |
| 2,372,536 | 3/1945 | Walker ............................. 51/284 X |
| 2,971,294 | 2/1961 | Hohmann ............................ 65/120 |
| 3,543,402 | 12/1970 | Seager ..................................... 65/61 |
| 3,555,663 | 1/1971 | Forman............................... 65/61 X |
| 3,843,343 | 10/1974 | Okada et al. ....................... 65/61 X |

*Primary Examiner*—S. Leon Bashore
*Assistant Examiner*—Frank W. Miga
*Attorney, Agent, or Firm*—Haseltine, Lake & Waters

[57] ABSTRACT

In a toughened lens which has been subjected to chemical tempering process and then to edge grinding, the fracture strength can be greatly enhanced if the peripheral portion is chamfered with the angle of chamfering to the tangential line on the optical surface of the lens not greater than 45°. This toughened effect is further increased by subjecting the chamfered peripheral portion to such a post treatment as mechanical polishing, chemical etching or thermal polishing.

5 Claims, 6 Drawing Figures

3,981,709

EDGE PROCESSING OF CHEMICALLY TOUGHENED LENSES

BACKGROUND OF THE INVENTION

This invention relates to a process for the production of toughened lenses.

Spectacle lenses and other optical lenses are generally prepared from glass, and they are fatally defective that because of brittleness inherent of glass they are very fragile and frail. Accordingly, development of lenses having improved impact strength for preventing injuries by breakage of spectacles during wearing has been demanded in the art and various attempts have been made to develop such lenses. As means for determining the impact strength in spectacle lenses, a so-called FDA test method was proposed by Food and Drug Administration. According to this method, a lens is supported on a circular stand, a steel ball having generally a diameter of 16 mm and a weight of about 16g is let to fall on the center of the lens from a height of 127 cm, and it is examined whether it is broken or not.

In general, the tensile strength of the surface portion of a lens is drastically reduced by the presence of minute scratches and hair cracks formed on the surface portion during the processing of glass. Accordingly, it is considered that breakage occurs on the surface portion under a tensile stress and the breakage is then developed therefrom. Formation of a toughening layer having an internal compression stress on the surface portion of a lens by subjecting the lens surface to the chemical tempering process is effective for increasing the impact strength as determined by the above-mentioned FDA test method or the like. In lenses which have been subjected to the surface tempering treatment, the effect of preventing breakages owing to defects on the surface portion is satisfactory to some extent, but it has been found that no satisfactory effect can be obtained for preventing breakages developed from the peripheral portion. More specifically, when a lens is subjected to the surface tempering treatment, a tensile stress is generated at the central portion in the direction of the lens thickness in correspondence to the internal compression stress in the toughened layer of the surface portion, but when edge grinding is conducted on the edge portion after the chemical tempering treatment, the toughened layer is removed from the edge portion and a tensile stress layer is exposed. Since the tensile stress in this layer is likely to promote defects in the lens, this tensile stress layer has had influences on the impact strength of the edge portion.

SUMMARY OF THE INVENTION

It is a primary object of this invention to solve the above-mentioned problem involved in production of toughened lenses. In other words, the primary object of this invention is to provide a process for the production of toughened lenses, according to which the tensile stress in the edge portion is moderated or eliminated in lenses which have been subjected to the chemical tempering treatment and then to the edge grinding.

More specifically, in accordance with this invention, there is provided a process for the production of toughened lenses, which comprises chamfering the edge portion of a lens which has been subjected to the chemical tempering treatment and then to the edge grinding, the angle of chamfering to the tangential line to the optical surface of the lens at the edge thereof being not greater than 45°. Such chamfering is effective to remove the toughening layer in the peripheral portion of the lens and therefore the compression stress in the peripheral portion is eliminated. Thus, the corresponding tensile stress is also eliminated at the peripheral portion and the fracture strength of the edge portion of the lens is drastically enhanced. In this invention, if the inclined face formed by the chamfering is subjected to the polishing treatment, the fracture strength of the peripheral portion is further improved.

DETAILED DESCRIPTION OF THE PREFERRED EMBODIMENTS

This invention will now be described in detail by reference to the accompanying drawings.

Figure 1:
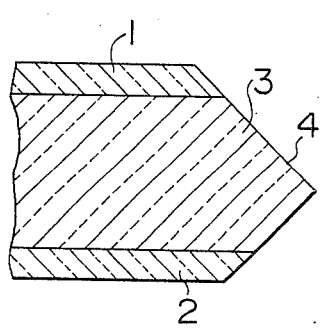
FIG. 1 is a sectional view illustrating a part of a spectacle lens which has been subjected to the surface tempering treatment and then to the edge grinding.

Referring to FIG. 1 showing a spectacle lens which has been subjected to a surface tempering treatment and then to an edge grinding, in both the surface portions of the lens, there are formed toughening layers 1 and 2 in which an internal compression stress is present. A tensile stress corresponding to this compression stress is generated in the intermediate layer 3. The edge portion is ground so that it will be fit to a spectacle frame, but its shape is not particularly critical. It is preferred that formation of the toughening layers be conducted in a lens factory and the edge grinding be carried out at a workshop of an optician or the like. In general, it is said that the thickness of the reinforced layer is 0.05 to 0.25 mm. If the edge grinding is conducted on a lens which has been subjected to the chemical tempering treatment, the toughening layer is completely removed in the peripheral portion of the lens.

Figure 2:
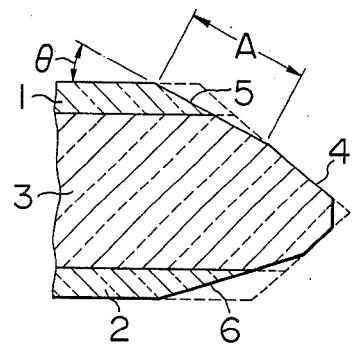
FIG. 2 is a sectional view illustrating a part of a spectacle lens prepared according to one embodiment of the process of this invention.

FIG. 2 illustrates a lens chamfered and according to the process of this invention. In the peripheral portion of the lens, there are formed chamfered faces 5 and 6 on both the optical surfaces. It is preferred that the angle θ of the chamfered face 5 or 6 be not greater than 45°C, recommendably not greater than 30°C. In the case of a lens having a curved surface, this angle θ is determined as the angle between the chamfered face and the tangential line to the optical. If such chamfered face is subjected to polishing treatment using a resin-bond grinding wheel of silicon carbide grade No. 1000 to 2000 having a diameter of 15 cm rotated at 650 to 750 r.p.m., the fracture strength of the lens is further enhanced. It is sufficient that the depth of the chamfering is such that the layers 1 and 2 are removed in the peripheral portion of the lens. In the embodiment shown in FIG. 2, the width of the chamfered face is about 0.2 to 0.5 mm.

Figure 3:
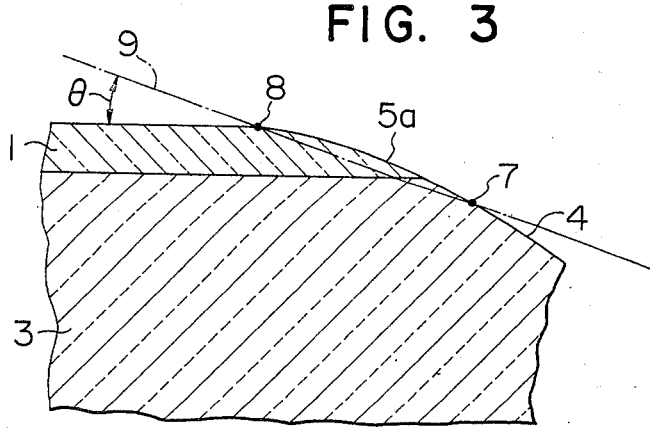
FIG. 3 is an enlarged partial sectional view illustrating another embodiment of this invention.

FIG. 3 illustrates an embodiment in which the chamfered face is composed of a curved face. More specifically, the chamfered face 5a is composed of an arcuately curved face between the edge portion 4 and the lens optical surface. In this embodiment, this chamfered face 5a has a curved face continuous from the edge portion 4 to the lens optical surface, but this curved face may be discontinuous. In this embodiment, the inclination of the chamfered face 5a may be regarded as being indicated by the line 9 connecting both ends 7 and 8 thereof.

Figure 4:
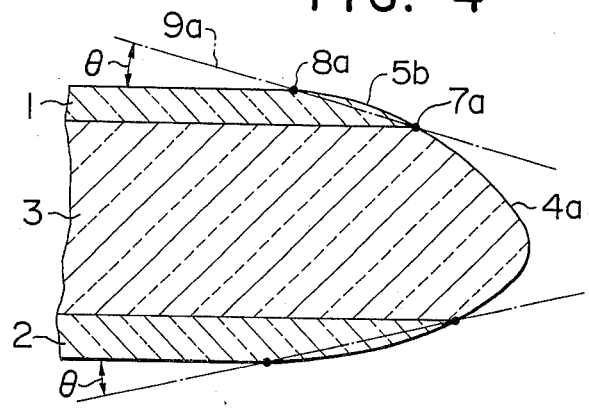
FIG. 4 is a sectional view illustrating still another embodiment of this invention.

FIG. 4 illustrates an embodiment where the edge grinding is conducted so as to form a parabolaid, whereby the chamfering effect is simultaneously attained. In the peripheral portion of the lens, an edge 4a and a chamfered face 5b are formed by one continuous curved face. In this embodiment, the inclination of the chamfered face may be regarded as being represented by the line 9a connecting two points 7a and 8a.

A toughened lens processed into a form shown in FIG. 2 according to this invention and a conventional toughened lens were subjected to a FDA test in which a steel ball of a weight of 16.2 g was let to fall from a height of 127 cm. Results obtained are shown in Table 1, from which it will readily be understood that the fracture strength of lenses can be greatly enhanced according to the process of this invention.

Table 1

|  | Number of Samples Tested | Number of Samples Broken | Breakage Ratio (%) |
|---|---|---|---|
| Tempering Alone | 120 | 85 | 91.2 |
| Chamfering of Peripheral Portion | 120 | 26 | 21.6 |
| Polishing on Chamfered Face | 120 | 0 | 0 |

The above FDA test was conducted on various chamfered faces differing in the inclination angle to obtain results shown in Table 2.

Table 2

| Inclination Angle | Number of Samples Tested | Number of Samples Broken | Breakage Ratio (%) |
|---|---|---|---|
| less than 15° | 20 | 0 | 0 |
| 15° – 30° | 20 | 0 | 0 |
| 30° – 45° | 20 | 5 | 25 |
| 45° – 60° | 20 | 13 | 65 |

As is apparent from the results shown in Table 2, the fracture strength can be highly increased when the angle of the chamfered face is not greater than 45°.

The foregoing effect attained by the edge-processing of this invention can be enhanced by some post treatments, embodiments of which will now be illustrated by reference to FIGS. 5 and 6.

Figure 5:
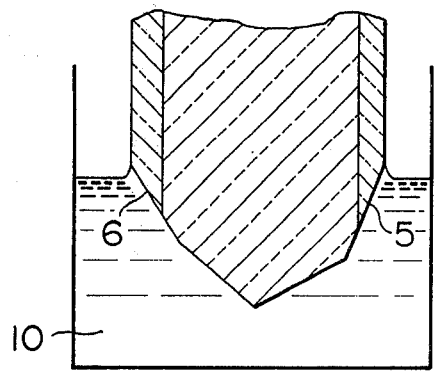
FIG. 5 is a sectional view showing a chemical finishing of chamfered faces.

In the embodiment shown in FIG. 5, the chamfered faces 5 and 6 formed on both the surfaces of a lens according to the process of this invention are immersed in an aqueous solution containing 10% of hydrofluoric acid and 10% of nitric acid for about 5 to about 10 minutes, whereby defects such as hair cracks are corroded and removed, or even if these defects are not completely removed, the curvature radius of the top end of the hair crack at which the stress will be concentrated is enlarged to increase the resistance to fracture. When 20 samples finished according to this embodiment were tested by the FDA method, the breakage ratio was 10%.

Figure 6:
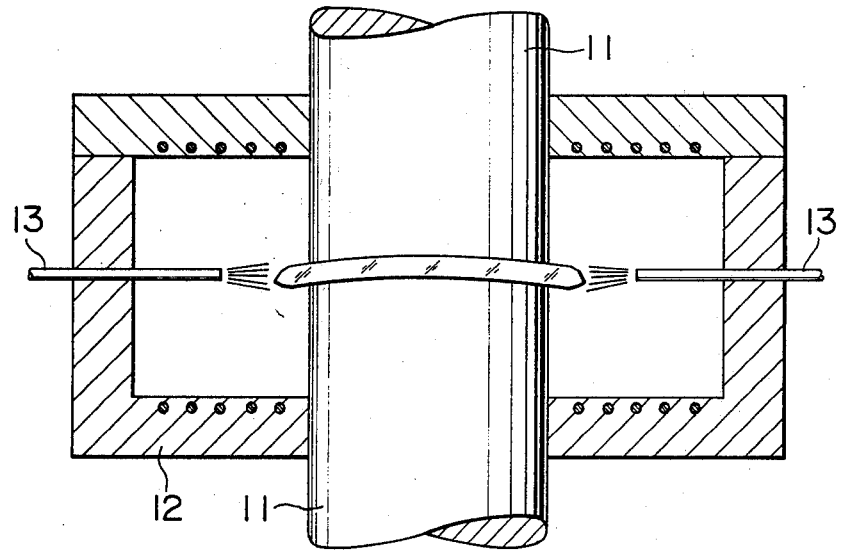
FIG. 6 is a sectional view illustrating a thermal treatment of chamfered face.

In the embodiment shown in FIG. 6, a lens having chamfered faces formed according to this invention is gripped on both the surfaces by plugs 11 composed of a substance having a good heat conductivity, such as stainless steel, and the lens is heated in this state in an electric furnace 12 at a temperature not exceeding the transition point Tg of glass. The heat is transferred from the peripheral portion of the lens to the interior and conducted to the outside through the plugs. In this state, the edge portion of the lens is locally heated at a temperature higher than the softening point by means of a fine burner 13. Thus, defects such as hair cracks are eliminated, and the effect of this invention can be enhanced.

As is apparent from the foregoing illustration, according to the process of this invention, lenses having a very high fracture strength and capable of passing the FDA test substantially completely can be produced. Further, in this invention, if the edge portion of the lens is subjected to the polishing at least on the concave side, the fracture strength of the lens can be further enhanced.

The invention has thus been shown and described with reference to specific embodiments, however, it should be noted that the invention is in no way limited to the details of the illustrated embodiments but changes and modifications may be made without departing from the scope of the appended claims.

What is claimed is:

1. A process for the production of toughened lenses, comprising the steps of chamfering peripheral portion of a lens which has been subjected to chemical tempering treatment, and edge grinding thereafter with the angle of chamfering to the tangential line on the optical surface of the lens at the edge thereof being less than 45°; said chemical tempering treatment imparting toughness properties to said lens, said toughness properties remaining substantially after said edge grinding, said chamfering removing distortions appearing at the lens periphery when carrying out said edge grinding.

2. A process for the production of toughened lenses according to claim 1 wherein an inclined face formed by said chamfering is subjected to a polishing treatment.

3. A process for the production of toughened lenses according to claim 2 wherein said polishing treatment comprises polishing with a resin bond grinding wheel of silicon carbide having grade No. 1000 to 2000.

4. A process for the production of toughened lenses according to claim 1 wherein the peripheral portion of the chamfered lens is further treated chemically with a hydrofluoric acid and nitric acid combination.

5. A process for the production of toughened lenses according to claim 1 including the step of applying to the peripheral portion of the chamfered lens a thermal polishing treatment.

* * * * *